United States Patent [19]

Bosch et al.

[11] Patent Number: 4,801,673
[45] Date of Patent: Jan. 31, 1989

[54] ROOM TEMPERATURE CROSSLINKABLE COMPOSITIONS

[75] Inventors: Erhard Bosch, Burghausen, Fed. Rep. of Germany; Franz Neuhauser, Geretsburg, Austria; August Schiller, Neuötting, Oswin Sommer, Burghausen, both of Fed. Rep. of Germany.

[73] Assignee: Wacker-Chemie GmbH, Munich, Fed. Rep. of Germany

[21] Appl. No.: 69,749

[22] Filed: Jul. 6, 1987

[30] Foreign Application Priority Data

Jul. 17, 1986 [DE] Fed. Rep. of Germany ....... 3624206

[51] Int. Cl.$^4$ .............................................. C08G 77/04
[52] U.S. Cl. ....................................... 528/34; 528/18; 528/37; 528/901
[58] Field of Search ....................... 528/34, 37, 901, 18

[56] References Cited

U.S. PATENT DOCUMENTS

| | | | |
|---|---|---|---|
| 3,146,250 | 8/1964 | Speier | 528/42 |
| 3,941,856 | 3/1976 | Creasey et al. | 528/34 |
| 4,499,234 | 2/1985 | Pratt et al. | 528/34 |
| 4,517,352 | 5/1958 | White et al. | 528/18 |
| 4,528,324 | 7/1985 | Chung et al. | 528/34 |

Primary Examiner—John C. Bleutge
Assistant Examiner—Ralph H. Dean, Jr.

[57] ABSTRACT

Compositions which are storable under anhydrous conditions, but when exposed to atmospheric moisture crosslink at room temperature to form elastomers comprising a diorganopolysiloxane having one Si-bonded hydroxyl group in each of its terminal units, and a cyclic silane of the formula

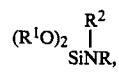

where R represents a divalent hydrocarbon radical, $R^1$ represents the same or different monovalent hydrocarbon radicals, which can be substituted by an alkoxy group, and $R^2$ represents hydrogen or an alkyl or aminoalkyl radical in which the silicon atom of the cyclic silane is bonded to a nitrogen atom and to two monovalent hydrocarbon radicals, which can be substituted with an alkoxy group via oxygen and to a hydrocarbon radical via carbon.

3 Claims, No Drawings

ROOM TEMPERATURE CROSSLINKABLE COMPOSITIONS

The present invention relates to crosslinkable compositions and more particularly to compositions which crosslink at room temperature when exposed to atmospheric moisture to form elastomers.

BACKGROUND OF THE INVENTION

Compositions which are stable under anhydrous conditions, but when exposed to atmospheric moisture crosslink at room temperature to form elastomers, are described in U.S. Pat. No. 4,424,157 to Chung. These compositions contain a diorganopolysiloxane having one Si-bonded hydroxyl group in each of its terminal units, a silane containing a cyclic amide group, in which the silicon atom is bonded to a nitrogen atom, to two monovalent hydrocarbon radicals via oxygen and to a monovalent hydrocarbon radical via carbon, and optionally at least one additional substance.

It is, therefore, an object of the present invention to provide compositions which are stable in the absence of moisture, but when exposed to moisture, crosslink at room temperature to form elastomers. Another object of the present invention is to provide compositions which may be stored under anhydrous conditions, but when exposed to atmospheric moisture, crosslink rapidly at room temperature. A further object of the present invention is to provide compositions which may be stored under anhydrous conditions, but when exposed to atmospheric moisture, crosslink to form elastomers that will adhere to substrates upon which they are formed in the absence of primers. A still further object of the present invention is to provide a method for preparing compositions which are stable under anhydrous conditions, but when exposed to atmospheric moisture, crosslink to form elastomers.

SUMMARY OF THE INVENTION

The foregoing objects and others which will become apparent from the following description are accomplished in accordance with this invention, generally speaking, by providing compositions which are stable under anhydrous conditions, but when exposed to atmospheric moisture, crosslink at room temperature to form elastomers comprising a diorganopolysiloxane having one Si-bonded hydroxyl group in each of its terminal units and a cyclic silane of the formula

where R represents a divalent hydrocarbon radical, $R^1$ represents the same or different monovalent hydrocarbon radicals or monovalent hydrocarbon radicals which can be substituted by an alkoxy group and $R^2$ represents hydrogen or an alkyl or aminoalkyl radical, in which the silicon atom of the cyclic silane is bonded to a nitrogen atom and to two monovalent hydrocarbon radicals which may be substituted with an alkoxy group via oxygen and to a hydrocarbon radical via carbon.

These compositions may be prepared by mixing the diorganopolysiloxane having one Si-bonded hydroxyl group in each of its terminal units with the cyclic silane, in which the silicon atom of the cyclic silane is bonded to a nitrogen atom and to two monovalent hydrocarbon radicals which may be substituted with an alkoxy group via oxygen and to a hydrocarbon radical via carbon and optionally with at least one additional substance and thereafter the compositions are exposed to atmospheric moisture to form elastomers.

DESCRIPTION OF THE INVENTION

The diorganopolysiloxanes having one Si-bonded hydroxyl group in each of their terminal units used in this invention are the same diorganopolysiloxanes which have been or could have been used heretofore in preparing compositions which can be stored under anhydrous conditions, but when exposed to atmospheric moisture, crosslink at room temperature to form elastomers. The diorganopolysiloxanes used in this invention are the same diorganopolysiloxanes having terminal hydroxyl groups which may be mixed with a silicon compound having at least 3 groups per molecule capable of condensation, such as methyltris-(ketoximo)-silane or with the silanes described in U.S. Pat. No. 4,424,157 to Chung to form elastomers. The diorganopolysiloxanes which have one Si-bonded hydroxyl group in each of their terminal units that are preferably employed in the preparation of the compositions of this invention may be represented by the formula $$HO(SiR^3{}_2O)_m SiR^3{}_2OH,$$

where $R^3$ represents the same or different monovalent, SiC-bonded organic radicals and m represents an integer having a value of at least 10.

Although these are not generally shown in the formula, siloxane units in addition to the diorganosiloxane units $(SiR^3{}_2O)$ can be present within or along the siloxane chains. Examples of such other siloxane units, which are in most cases present only as impurities, are those of the formula  where $R^3$ is the same as above. Preferably, however, the amount of such siloxane units other than the diorganosiloxane units is at most about 2 mol percent of the siloxane units present in the diorganopolysiloxanes having Si-bonded hydroxyl groups.

Examples of radicals represented by $R^3$ are especially hydrocarbon radicals having from 1 to 18 carbon atoms per radical, such as linear or branched alkyl radicals, such as, for example, the methyl, ethyl, n-propyl, isopropyl, n-butyl, sec-butyl, 2-ethylhexyl and octadecyl radicals; cycloalkyl radicals, such as the cyclohexyl radical and methylcyclohexyl radicals; linear or branched hydrocarbon radicals containing carbon and hydrogen as the only atoms and having at least one aliphatic carbon-carbon double bond, such as the vinyl, allyl and methallyl radicals; aryl radicals, such as the phenyl and xenyl radicals; alkaryl radicals, such as the tolyl radicals; and aralkyl radicals such as the beta-phenylethyl radical.

Examples of other radicals represented by $R^3$ are linear or branched or cyclic substituted hydrocarbon radicals, such as the halogenated hydrocarbon radicals, for example, the 3,3,3-trifluoropropyl radical and chlorophenyl radicals; and cyanoalkyl radicals, such as the beta-cyanoethyl radical. Preferably, because of the availability, at least 90 percent of the number of $R^3$ radicals, that is the SiC-bonded radicals in the diorganopolysiloxanes having hydroxyl groups in each of their terminal units in the above formula are methyl radicals.

The diorganopolysiloxanes having one Si-bonded hydroxyl group in each of their terminal units can be the same or different homopolymers or copolymers, and the individual molecules can have the same or different chain lengths.

The average viscosity of the diorganopolysiloxanes having one Si-bonded hydroxyl group in each of their terminal units is preferably from 500 to $1 \times 10^6$ mPa.s at 25° C.

Preferably, R represents a divalent aliphatic hydrocarbon radical, in particular a hydrocarbon radical free of aliphatic carbon-carbon double bonds and having from 1 to 10 carbon atoms per radical. Examples of such radicals are those shown in the following formulas —$(CH_2)_3$—
—$(CH_2)_4$—
—$(CH_2)_5$—
—$(CH_2)_6$—
—$CH_2CH(CH_3)CH_2$—
—$CH_2CH(C_2H_5)(CH_2)_2$—

Is is apparent from the above formulas that the R radicals can be straight-chain or branched hydrocarbon radicals. However, a particularly preferred radical represented by R is a radical having the formula

—$(CH_2)_3$—.

Preferably, the radicals represented by $R^1$ contain from 1 to 6 carbon atoms per radical and are straight-chain or branched alkyl radicals, such as the methyl, ethyl, n-propyl, isopropyl, n-butyl, sec-butyl or pentyl radicals. Also, $R^1$ can be, for example, a phenyl radical. An example of a hydrocarbon radical substituted by an alkoxy group, and preferably an alkyl radical substituted by an alkoxy group, is a radical of the formula $CH_3O(CH_2)_2$—.

The alkyl and aminoalkyl radicals represented by $R^2$ can also be linear, branched or cyclic radicals. The examples of alkyl radicals represented by $R^1$ above are also equally applicable to the alkyl radical represented by $R^2$ Another important example of an $R^2$ radical is the cyclohexyl radical.

Examples of suitable aminoalkyl radicals are those of the formula
$H_2N(CH_2)_2$—,
$H_2N(CH_2)_3$— and
$(CH_3)_2N(CH_2)_2$—.

Specific examples of suitable cyclic silanes having the formula

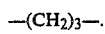

where R, $R^1$ and $R^2$ are the same as above are:

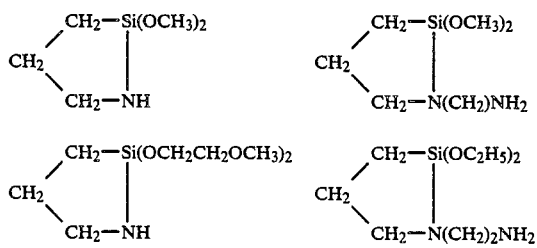

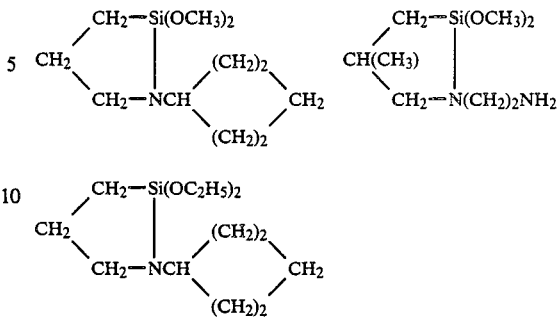

The silanes used in accordance with this invention are prepared in a known manner. They can, for example, be prepared by heating a silane of the formula $(R^1O)_3SiRNHR^2$, where R, $R^1$ and $R^2$ are the same as above, to a temperature above 100° C., preferably to temperatures at or close to the boiling point of the particular silane employed. The resultant alcohol, having the formula $R^1OH$, can in some cases, be distilled off as it is formed during the reaction. A process for preparing the silanes of the type used in accordance with this invention is described in U.S. Pat. No. 3,146,250 to Speier.

A single silane having the above formula may be used in this invention, or a mixture of at least two different types of such silanes can be used in preparing the compositions of this invention. Preferably the silanes used according to this invention are employed in an amount of from 2 to 20 percent by weight, and more preferably in an amount of from 3 to 10 percent by weight, based on the total weight of the composition.

Examples of additional substances which can be used in the preparation of the compositions of this invention are silanes of the formula $R_n{}^3Si(OR^1)_{4-n}$ where $R^1$ and $R^3$ are the same as above and n is 0 or 1, or partial hydrolyzates thereof. Other substances which may be employed are hexamethoxydisiloxane, condensation catalysts, reinforcing inorganic fillers, non-reinforcing inorganic fillers, pigments, soluble dyestuffs, odorous substances, plasticizers such as dimethylpolysiloxanes, which are liquid at room temperature and endblocked by trimethylsiloxy groups, or phosphate esters, fungicides, resinous organopolysiloxanes including those consisting of $(CH_3)_3SiO_{\frac{1}{2}}$— and $SiO_{4/2}$— units, organic resins such as homopolymers or copolymers of acrylonitrile, styrene, vinyl chloride or propylene. The organic resins, in particular copolymers of styrene and n-butyl acrylate, may for example, be prepared in the presence of the diorganopolysiloxanes having one Si-bonded hydroxyl group in each of their terminal units by polymerizing the monomers in the presence of free radical initiators. Still other substances which may be employed in the preparation of these compositions are corrosion inhibitors, polyglycols which can be esterified and/or etherified, oxidation inhibitors, heat stabilizers, solvents, agents which influence the electrical properties, such as conductive carbon black, agents which impart flame retardancey, light stabilizers, agents that prolong the skin forming time, such as silanes having an SiC-bonded mercaptoalkyl radical, and cell producing agents, such as azodiocarbonamide.

The condensation catalysts which may be employed in the compositions of this invention are the same condensation catalysts which have been or could have been used heretofore in compositions that are storable under anhydrous conditions, but when exposed to atmospheric moisture crosslink at room temperature to form elastomers, which have been prepared by mixing a diorganopolysiloxane having one Si-bonded hydroxyl group in each of its terminal units with a silane, the silicon atom of which is bonded via oxygen to at least three hydrocarbon radicals which can be substituted by an alkoxy group, or an oligomer thereof. All the condensation catalysts mentioned in U.S. Pat. No. 4,424,157 which is incorporated herein by reference, may be employed in the compositions of this invention. Examples of condensation catalysts are butyl titanates and organic tin compounds such as di-n-butyl-tin diacetate, di-n-butyl-tin dilaurate and reaction products of a silane or oligomer thereof, having as hydrolyzable groups, at least two monovalent hydrocarbon radicals per molecule, which are bonded via oxygen to silicon and are optionally substituted by an alkoxy group with a diorgano-tin diacylate, all the valencies of the tin atoms being saturated in these reaction products by oxygen atoms of the grouping

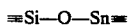

or by SnC-bonded monovalent organic radicals. The preparation of such reaction products is described in U.S. Pat. No. 4,460,761 to Schiller et al.

Examples of reinforcing inorganic fillers, that is, organic fillers having a BET surface area of at least 50 m$^2$/g are especially pyrogenically produced silicon dioxides, silica dehydrated hydrogels where the structure is preserved, and other types of precipitated silicon dioxide having a BET surface area of at least 50 m$^2$/g.

Examples of non-reinforcing inorganic fillers, that is, inorganic fillers having a BET surface area of less than 50 m$^2$/g, are quartz powder, diatomaceous earth, iron oxide, zinc oxide, titanium dioxide, calcium carbonate, magnesium carbonate, zinc carbonate, non-conductive carbon black, mica and Neuburg chalk.

All these reinforcing and non-reinforcing fillers can be hydrophilic or hydrophobic, such as calcium carbonate which has been treated with, for example, stearic acid to render it hydrophobic.

The compositions of this invention can be prepared by mixing the constituents with one another in any desired order. The mixing is preferably carried out at room temperature. If desired, however, this mixing can also take place at elevated temperatures, for example, at temperatures in the range of from 35° to 135° C. Preferably, moisture is excluded as far as possible during the mixing process.

The moisture content of the air is usually sufficient for crosslinking the compositions of this invention. If desired, crosslinking can also be carried out at temperatures higher or lower than room temperature, for example, from about −5° to 10° C. or from 30° to about 50° C.

The compositions of this invention can be used for all purposes for which similar compositions that are storable, under anhydrous conditions, but when exposed to atmospheric moisture crosslink at room temperature to form elastomers, can be employed.

The compositions of this invention are, therefore, suitable, for example, as sealing compounds for joints, including vertically extending joints, and similar cavities of, for example from 10 to 40 mm width, such as in buildings, land vehicles, watercraft and aircraft, or as adhesives or putties, for example, in window construction or in the manufacture of aquariums or glass cabinets. The compositions of this invention may be used to form protective coatings, including those whose surfaces are continuously exposed to the action of fresh water or sea water, of or coatings which prevent slipping, or of rubber-elastic mouldings and for the insulation of electrical or electronic devices.

In the following examples and in preparing the silanes, all parts and percentages are by weight, unless otherwise specified.

In the following examples, the Shore A hardness is determined in accordance with DIN (*Deutsche Industrie Norm*=German Industrial Standard) 53505, the elongation at break is determined in accordance with DIN 53504-S 3 A, and the tensile strength is, likewise, determined according to DIN 53504-S 3 A.

EXAMPLE 1

About 42 parts of a dimethylpolysiloxane having one Si-bonded hydroxyl group in each of its terminal units and having a viscosity of 20,000 mPa.s at 25° C. are mixed with 21 parts of a dimethylpolysiloxane having one Si-bonded hydroxyl group in each of its terminal units and having a viscosity of 80,000 mPa.s at 25° C., 20 parts of a dimethylpolysiloxane endblocked by trimethylsiloxy groups and having a viscosity of 35 mPa.s, 5.2 parts of a cyclic silane of the formula

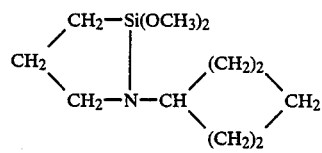

12.6 parts of silicon dioxide produced pyrogenically in the gas phase and having a BET surface area of 150 m$^2$/g and 0.2 part of a reaction product which is obtained by heating a mixture containing 4 parts of tetraethyl silicate and 1 part of di-n-butyl-tin diacetate for 6 hours to 120° C. at ambient pressure with stirring while simultaneously distilling off the ethyl acetate formed.

The composition thus obtained is deaired under vacuum and stored under anhydrous conditions. When the composition is exposed to atmospheric moisture, it crosslinks at room temperature to form an elastomer.

A sample (a) of the composition which is prepared above is crosslinked immediately after it has been prepared. During crosslinking, the skin formation time at a 50 percent relative humidity and at 23° C. is determined.

Another sample (b) of the composition prepared above, is stored in an airtight, sealed aluminum tube for 3 months at 50° C. in a drying cabinet and then crosslinked. The skin formation time is determined under the conditions indicated above. The physical properties of the resultant elastomers obtained from samples (a) and (b) are determined on 2 mm thick sheets 14 days after exposure to atmospheric moisture. The results are shown in Table 1.

TABLE 1

| Sample | Skin formation time minutes | Shore A hardness | Tensile Strength N/mm² | Elongation at break % |
| --- | --- | --- | --- | --- |
| (a) | 14 | 23 | 2.0 | 600 |
| (b) | 15 | 24 | 1.9 | 570 |

As indicated by the values in Table 1, the properties remain essentially unchanged when stored at elevated temperature.

Samples of the composition, prepared above are extruded on the substrates shown in Table 2. These substrates were previously degreased with a solvent and are stored for 8 days at a 50 percent relative humidity in the air at 23° C. The adhesive strength of the elastomers on the substrates on which they are formed is determined. The results are shown in Table 2.

TABLE 2

| Substrate | Adhesive strength |
| --- | --- |
| Glass | + |
| Aluminum | + |
| Stainless steel (V₂A) | + |
| Rigid polyvinyl chloride | ∅ |
| Polyamide | + |

+ = good adhesion = cohesion crack = crack in the elastomer
∅ = moderate adhesion = cohesion crack and adhesion crack (crack in the elastomer and separation from the substrate)

COMPARATIVE EXAMPLE

The procedure described in Example 1 is repeated, except that 5.2 parts of a silane of the formula

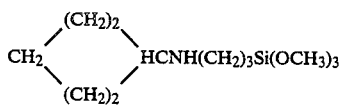

is substituted for 5.2 parts of the cyclic silane used in Example 1.

The same skin formation time and virtually the same values are obtained as in sample (a) in Example (1).

In the case of sample (b), no measurable skin formation is observed even after storage for 1 month at 50° C. Even after exposure to atmospheric moisture for 14 days, the resultant elastomer has no measurable physical properties.

EXAMPLE 2

(A) A mixture containing 75 parts of a dimethylpolysiloxane having one Si-bonded hydroxyl group in each of its terminal units and having a viscosity of 50,000 mPa.s at 25° C., 5 parts of hexamethyldisilazane, 2.5 parts of water and 20 parts of silicon dioxide produced pyrogenically in the gas phase and having a BET surface area of 150 m²/g are kneaded in a Z-type kneader until a homogeneous mixture is obtained. The mixture is then heated to 120° C., kneaded for 5 hours at this temperature, and the excess hexamethyldisilazane and water are distilled off at this temperature at 100 hPa (absolute).

(B) About 94.2 parts of the resultant mixture having a viscosity of 300,000 mPa.s at 25° C. are mixed with 5.6 parts of the cyclic silane of Example 1 and 0.2 part of the product obtained from the reaction of tetraethyl silicate and dibutyltin diacetate, prepared in accordance with Example (1).

The composition is deaired under vacuum and then stored under anhydrous conditions. When the composition is exposed to atmospheric moisture, it crosslinks at room temperature to form an elastomer.

The properties of the resultant elastomer are tested in accordance with Example (1). The results are shown in Table 3.

TABLE 3

| Sample | Skin formation time minutes | Shore A hardness | Tensile Strength N/mm² | Elongation at break % |
| --- | --- | --- | --- | --- |
| (a) | 12 | 21 | 3.3 | 720 |
| (b) | 13 | 23 | 3.0 | 630 |

EXAMPLE 3

About 94.2 parts of the mixture prepared in accordance with the procedure described in Example 2(A), are mixed with 3.75 parts of the cyclic silane of Example (1), 1.9 parts of methyltrimethoxysilane and 0.15 part of the product obtained from the reaction of tetraethyl silicate and dibutyl-tin diacetate, prepared in accordance with Example (1).

The resultant composition is deaired under vacuum and then stored in the absence of moisture. When exposed to moisture, the composition crosslinks at room temperature to form an elastomer.

The properties of the resultant elastomer are tested in accordance with Example (1). The results are shown in Table 4.

TABLE 4

| Sample | Skin formation time minutes | Shore A hardness | Tensile Strength N/mm² | Elongation at break % |
| --- | --- | --- | --- | --- |
| (a) | 16 | 31 | 4.8 | 800 |
| (b) | 19 | 33 | 5.2 | 840 |

EXAMPLE 4

About 47.6 parts of a dimethylpolysiloxane having one Si-bonded hydroxyl group in each of its terminal units and having a viscosity of 20,000 mPa.s at 25° C. are mixed with 47.6 parts of quartz powder, 4.65 parts of the cyclic silane of Example (1) and 0.15 part of the product obtained from the reaction of tetraethylsilicate and dibutyl-tin diacetate, prepared in accordance with Example (1).

The resultant composition is deaired under vacuum and then stored in the absence of moisture. When exposed to moisture, the resultant composition crosslinks at room temperature to form an elastomer.

The properties of the resultant elastomer are tested in accordance with Example (1). The results are shown in Table 5.

TABLE 5

| Sample | Skin formation time minutes | Shore A hardness | Tensile Strength N/mm² | Elongation at break % |
| --- | --- | --- | --- | --- |
| (a) | 5 | 45 | 1.9 | 190 |
| (b) | 7 | 44 | 1.8 | 190 |

Preparation of the cyclic silanes used in the examples:

(A) The cyclic silane described in Example 1 is prepared in the following manner:

A silane of the formula

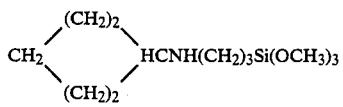

is heated to reflux at a pressure of about 1,020 hPa absolute, while distilling off the methanol thus formed. Fractional distillation of the residue under about 1 hPa (absolute) gives a cyclic silane having the formula of Example (1). The cyclic silane has the following physical properties:

Boiling point at 1 hPa (absolute): 93° C.
Density at 25° C.: 1.01 g/cm$^3$
Refractive index n $_D^{25}$: 1.467
Viscosity at 25° C.: 4.8 mm$^2$.s$^{-1}$ (B) The silane described in the Comparative Example is prepared in the following manner:

A silane of the formula

is prepared in the following manner:

A mixture containing 1 part of 3-chloropropyltrimethoxysilane and 5 parts of cyclohexylamine is heated under reflux conditions for 5 hours. After the resultant mixture has been cooled to room temperature, the amine hydrochloride is filtered off, and the excess cyclohexylamine is distilled off. The residue is distilled under 2 hPa (absolute). At 125° C., a silane having the above formula, which is identified as 3-cyclohexylaminopropyltrimethoxysilane, with a refractive index $n_D^{25}$ of 1.449 is obtained.

What is claimed is:

1. A composition which is storable under anhydrous conditions, but when exposed to moisture crosslinks at room temperature to form an elastomer comprising a diorganopolysiloxane having one Si-bonded hydroxyl group in each of its terminal units and a cyclic silane of the formula

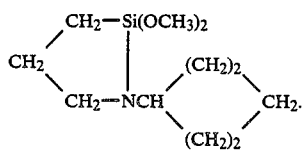

2. The composition of claim 1, wherein the cyclic silane is present in an amount of from 2 to 20 percent by weight, based on the total weight of the composition.

3. The composition of claim 1, wherein the composition contains a condensation catalyst.

* * * * *